United States Patent [19]

Yamamoto et al.

[11] Patent Number: 5,767,985
[45] Date of Patent: Jun. 16, 1998

[54] SYSTEM EMPLOYING FACSIMILE UNITS TO TRANSMIT E-MAIL BETWEEN INFORMATION PROCESSORS OVER PUBLIC TELEPHONE LINES

[75] Inventors: Taiji Yamamoto; Yutaka Uehara; Minoru Yoshida, all of Saitama, Japan

[73] Assignee: Fuji Xerox Co., Ltd., Tokyo, Japan

[21] Appl. No.: 425,204

[22] Filed: Apr. 20, 1995

[30] Foreign Application Priority Data

Jun. 29, 1994 [JP] Japan .................................. 6-148377

[51] Int. Cl.⁶ ............................................ H04N 1/32
[52] U.S. Cl. ........................ 358/402; 358/403; 358/436
[58] Field of Search .......................... 358/402, 403, 358/434, 440, 442, 468, 436; 379/67, 97, 98, 100; H04N 1/32

[56] References Cited

U.S. PATENT DOCUMENTS

| | | | |
|---|---|---|---|
| 5,018,191 | 5/1991 | Catron et al. | 379/100 |
| 5,146,488 | 9/1992 | Okada et al. | 379/100 |
| 5,384,830 | 1/1995 | Ide | 358/403 |
| 5,448,626 | 9/1995 | Kajiya et al. | 379/100 |
| 5,459,454 | 10/1995 | Nakano | 358/402 |
| 5,479,411 | 12/1995 | Klein | 358/403 |

FOREIGN PATENT DOCUMENTS

| | | |
|---|---|---|
| 60-89162 | 5/1985 | Japan . |
| 1-321762 | 12/1989 | Japan . |
| 2-94959 | 4/1990 | Japan . |
| 2-283136 | 11/1990 | Japan . |
| 5-308503 | 11/1993 | Japan . |
| 6-217069 | 8/1994 | Japan . |

Primary Examiner—Kim Vu
Attorney, Agent, or Firm—Finnegan, Henderson, Farabow, Garrett & Dunner, L.L.P.

[57] ABSTRACT

A facsimile/electronic-mail transforming system comprises a host unit linked through a network (LAN) to a plurality of other terminals as destinations of E-mails, and a facsimile unit connected directly to the host unit and also connected to the public telephone line. Other terminals outside the LAN sends E-mails through the public telephone line to the facsimile unit, which works as a gateway so that the E-mails are delivered to intended terminals on the LAN. When an originating terminal sends mail information, with destination indicating information being appended thereto, to the facsimile unit through the public telephone line, the information is received by the line controller and transferred through the interface to the host unit. In the host unit, the transferred information is received through the interface and saved in the storage. The main controller analyzes the destination indicating information to determine a destination terminal, and the mail information is delivered through the network controller to the destination terminal.

15 Claims, 7 Drawing Sheets

SYSTEM EMPLOYING FACSIMILE UNITS TO TRANSMIT E-MAIL BETWEEN INFORMATION PROCESSORS OVER PUBLIC TELEPHONE LINES

BACKGROUND OF THE INVENTION

1. Field of the Invention

The present invention relates to a facsimile/electronic mail transforming system, and more particularly to a facsimile/electronic mail (will be termed similarly "E-mail" hereinafter) transforming system including a specific information processor linked through a network such as a LAN to other information processors (workstations) that are destinations of E-mails, and a facsimile unit linked directly or through the network to the specific information processor and also connected to a public telephone line.

2. Description of the Related Art

In the conventional facsimile-workstation linkage system, a facsimile unit is merely a specialized image transfer device for receiving an image and transferring the image to the workstation, and for transmitting an image transferred from the workstation to another facsimile unit.

Japanese Patent Laid-open No. Hei 2-94959 discloses a technique of using facsimile units as gateways between the network and public telephone line, in which a facsimile unit that is connected to the network stores received image data of text, with text numbers being appended thereto, in its own memory and, in response to a request of delivery from a workstation through the network, it reads out the image data with the specified text number from the memory and transfers the image data to the workstation.

Recently, E-mail systems have been used for transacting messages among individuals through a communication network. The E-mail system is intended to communicate messages, even including graphic and vocal information, among individual users by utilizing both a LAN (Local Area Network) and a large-scale communication network. Messages sent to a user are stored in an E-mail box, which is a storage area assigned to the user in the memory provided for the network, and the user can access a received message for reading, filing or deleting by appropriate operations at the user's terminal.

However, the prior art system disclosed in the above Japanese Patent Laid-open No. Hei 2-94959 is only capable of performing communication of image information between the facsimile units workstations linked through a network, and it does not allow other facsimile units that are linked to the facsimile units through the public telephone line to access the network.

In the conventional E-mail system, facsimile units are solely used as terminals linked to a network, and are not used as gateways between the network and public telephone line (will be termed simply "gateway" hereinafter). Therefore, it is difficult for the facsimile units that are connected only to the public telephone line to send E-mails to intended destinations by using a LAN or the like.

SUMMARY OF THE INVENTION

The present invention is intended to address deficiencies and improve upon the foregoing prior art situation, and its prime object is to provide a facsimile/E-mail transforming system which enables general terminals such as facsimile units to send E-mails through the public telephone line to destination terminals on a network, such as a LAN, by way of a facsimile unit as the gateway.

Another object of the invention is to provide a facsimile/E-mail transforming system which enables the delivery of an E-mail sent by an originating terminal that is connected to the public telephone line to a destination terminal on a network automatically in the data form adapted to that destination terminal even if the data type of the E-mail is different from the data reception type of the destination terminal.

The present invention resides in a first facsimile/E-mail transforming system which comprises a specific information processor linked through a network to a plurality of other information processors as destinations of E-mails, and a facsimile unit connected directly or through the network to the specific information processor and also connected to a public telephone line. The facsimile unit includes a reception means for receiving mail information, with destination indicating information appended thereto, from an originating terminal linked through the public telephone line. One of the facsimile unit and the specific information processor includes an analysis means for analyzing destination indicating information received by the reception means thereby to determine an E-mail destination. A transmission means transmits the mail information received by the reception means to the determined E-mail destination.

When mail information, with destination indicating information appended being thereto, is sent from an originating terminal to the facsimile unit through the public telephone line, the reception means of the facsimile unit receives the information. The analysis means analyzes the received destination indicating information to determine an E-mail destination, and the transmission means transmits the received mail information to the determined E-mail destination.

The present invention further resides in the first information processor further includes a reception type register means in which the reception types of the other information processors are registered in advance, and a data form conversion means for reforming the mail information received by the reception means to have a data form acceptable to the E-mail destination, as determined by the analysis means in accordance with the record in the reception type register means relevant to the destination. The transmission means transmits the reformed mail information to the determined E-mail destination.

When mail information, with destination indicating information being appended thereto, is sent from an originating terminal to the facsimile unit through the public telephone line, the reception means of the facsimile unit receives the information. The analysis means analyzes the received destination indicating information to determine an E-mail destination. The data form conversion means reforms the received mail information to have a data form acceptable to the E-mail destination determined by the analysis means in accordance with the record in the reception type register means relevant to the destination, and the transmission means transmits the reformed mail information to the determined E-mail destination.

In another aspect, the present invention resides in a second facsimile/E-mail transforming system which comprises a specific information processor linked through a network to a plurality of other information processors as destinations of E-mails, and a facsimile unit connected directly or through the network to the specific information processor and also connected to a public telephone line. The facsimile unit includes a reception means for receiving mail information, with destination indicating information appended thereto, from an originating terminal linked through the public telephone line, and a transfer means for transferring information received by the reception means to the specific information processor. The specific information processor includes an analysis means for analyzing destination indicating information transferred by the transfer means thereby to determine an E-mail destination. A transmission means for transmitting the transferred mail information to the determined E-mail destination.

When mail information, with destination indicating information being appended thereto, is sent from an originating terminal to the facsimile unit through the public telephone line, the reception means of the facsimile unit receives the information and the transfer means transfers the received information to the specific information processor. In the specific information processor, the analysis means analyzes the transferred destination indicating information to determine an E-mail destination, and the transmission means transmits the transferred mail information to the determined E-mail destination.

The present invention additionally resides in the second facsimile/E-mail transforming system wherein:

the analysis means analyzes a DTMF signal as destination indicating information thereby to determine an E-mail destination; when mail information, with a DTMF signal as destination indicating information being appended thereto, is sent from an originating terminal to the facsimile unit through the public telephone line, the reception means of the facsimile unit receives the information and the transfer means transfers the received information to the specific information processor; in the specific information processor, the analysis means analyzes the DTMF signal to determine an E-mail destination, and the transmission means transmits the transferred mail information to the determined E-mail destination; mail information to be transmitted is preferably literal data, although other data forms are also applicable; or the analysis means analyzes image data as destination indicating information thereby to determine an E-mail destination; when mail information, with image data as destination indicating information being appended thereto, is sent from an originating terminal to the facsimile unit through the public telephone line, the reception means of the facsimile unit receives the information and the transfer means transfers the received information to the specific information processor; in the specific information processor, the analysis means analyzes the destination indicating image data to determine an E-mail destination, and the transmission means transmits the transferred mail information to the determined E-mail destination; in case mail information to be transmitted is of a type other than image data, an OCR (Optical Character Recognition) device or the like is suitably used to send only the destination indicating image data; or the analysis means analyzes vocal data as destination indicating information thereby to determine an E-mail destination; when mail information, with vocal data as destination indicating information being appended thereto, is sent from an originating terminal to the facsimile unit through the public telephone line, the reception means of the facsimile unit receives the information and the transfer means transfers the received information to the specific information processor; in the specific information processor, the analysis means analyzes the destination indicating vocal data to determine an E-mail destination, and the transmission means transmits the transferred mail information to the determined E-mail destination; mail information to be transmitted is preferably vocal data, although other data forms are also applicable; or the analysis means analyzes literal data as destination indicating information thereby to determine an E-mail destination; when mail information, with literal data as destination indicating information being appended thereto, is sent from an originating terminal to the facsimile unit through the public telephone line, the reception means of the facsimile unit receives the information and the transfer means transfers the received information to be specific information processor; in the specific information processor, the analysis means analyzes the destination indicating literal data to determine an E-mail destination, and the transmission means transmits the transferred mail information to the determined E-mail destination; mail information to be transmitted is preferably literal data, although other data forms are also applicable; or the specific information processor further includes a vocal/literal conversion means for converting vocal data transferred by the transfer means into literal data, and the transmission means transmits the converted literal data to the E-mail destination determined by the analysis means; when vocal data as mail information, with destination indicating information being appended thereto, is sent from an originating terminal to the facsimile unit through the public telephone line, the reception means of the facsimile unit receives the information and the transfer means transfers the received information to the specific information processor; in the specific information processor, the analysis means analyzes the destination indicating information to determine an E-mail destination, the vocal/literal conversion means converts the transferred vocal data into literal data, and the transmission means transmits the converted literal data to the E-mail destination determined by the analysis means; or the specific information processor further includes a vocal/image conversion means for converting vocal data transferred by the transfer means into image data, and the transmission means transmits the converted image data to the E-mail destination determined by the analysis means; when vocal data as mail information, with destination indicating information being appended thereto, is sent from an originating terminal to the facsimile unit through the public telephone line, the reception means of the facsimile unit receives the information and the transfer means transfers the received information to the specific information processor; in the specific information processor, the analysis means analyzes the destination indicating information to determine an E-mail destination, the vocal/image conversion means converts the transferred vocal data into image data, and the transmission means transmits the converted image data to the E-mail destination determined by the analysis means; or the specific information processor further includes an image/literal conversion means for converting image data transferred by the transfer means into literal data, and the transmission means transmits the converted literal data to the E-mail destination determined by the analysis means; when image data as mail information, with destination indicating information being appended thereto, is sent from an originating terminal to the facsimile unit through the public telephone line, the reception means of the facsimile unit transfers the received information to the specific information processor; in the specific information processor, the analysis means analyzes the destination indicating information to determine an E-mail destination, the image/literal conversion means converts the transferred image data into literal data, and the transmission means transmits the converted literal data to the E-mail destination determined by the analysis means; or the specific information processor further includes an image/vocal conversion means for converting image data transferred by the transfer means into vocal data, and the transmission means transmits the converted vocal data to the E-mail destination determined by the analysis means; when image data as mail information, with destination indicating information being appended thereto, is sent from an originating terminal to the facsimile unit through the public telephone line, the reception means of the facsimile unit receives the information and the transfer means transfers the received information to the specific information processor; in the specific information processor, the analysis means analyzes the destination indicating information to determine an E-mail destination, the image/vocal conversion means converts the transferred image data into vocal data, and the transmission means transmits the converted vocal data to the E-mail destination determined by the analysis means; or the specific information processor further includes a literal/image conversion means for converting literal data transferred by the transfer means into image data, and the transmission means transmits the converted image data to the E-mail destination determined by the analysis means; when literal data as mail information, with destination indicating information being appended thereto, is sent from an originating terminal to the facsimile unit through the public telephone line, the reception means of the facsimile unit receives the information and the transfer means transfers the received information to the specific information processor; in the specific information processor, the analysis means analyzes the destination indicating information to determine an E-mail destination, the literal/image conversion means converts the transferred literal data into image data, and the transmission means transmits the converted image data to the E-mail destination determined by the analysis means; or the specific information processor further includes a literal/vocal conversion means for converting literal data transferred by the transfer means into vocal data, and the transmission means transmits the converted vocal data to the E-mail destination determined by the analysis means; when literal data as mail information, with destination indicating information being appended thereto, is sent from an originating terminal to the facsimile unit through the public telephone line, the reception means of the facsimile unit receives the information and the transfer means transfers the received information to the specific information processor; in the specific information processor, the analysis means analyzes the destination indicating information to determine an E-mail destination, the literal/vocal conversion means converts the transferred literal data into vocal data, and the transmission means transmits the converted vocal data to the E-mail destination determined by the analysis means; or the specific information processor further includes a reception type register means in which the reception types of the other destination information processors are registered in advance, and a data form conversion means for reforming the mail information transferred by the transfer means to have a data form acceptable to the E-mail destination determined by the analysis means in accordance with the record in the reception type register means relevant to the destination, and the transmission means transmits the reformed mail information to the determined E-mail destination; when mail information, with destination indicating information being appended thereto, is sent from an originating terminal to the facsimile unit through the public telephone line, the reception means of the facsimile unit receives the information and the transfer means transfers the received information to the specific information processor; in the specific information processor, the analysis means analyzes the destination indicating information to determine an E-mail destination. The data form conversion means converts the transferred mail information to have a data form receptible for the E-mail destination determined by the analysis means in accordance with the record in the reception type register means relevant to the destination, and the transmission means transmits the reformed mail information to the determined E-mail destination.

DETAILED DESCRIPTION OF THE PREFERRED EMBODIMENT

An embodiment of the present invention will be explained with reference to FIG. 1 through FIG. 9.

Figure 1:
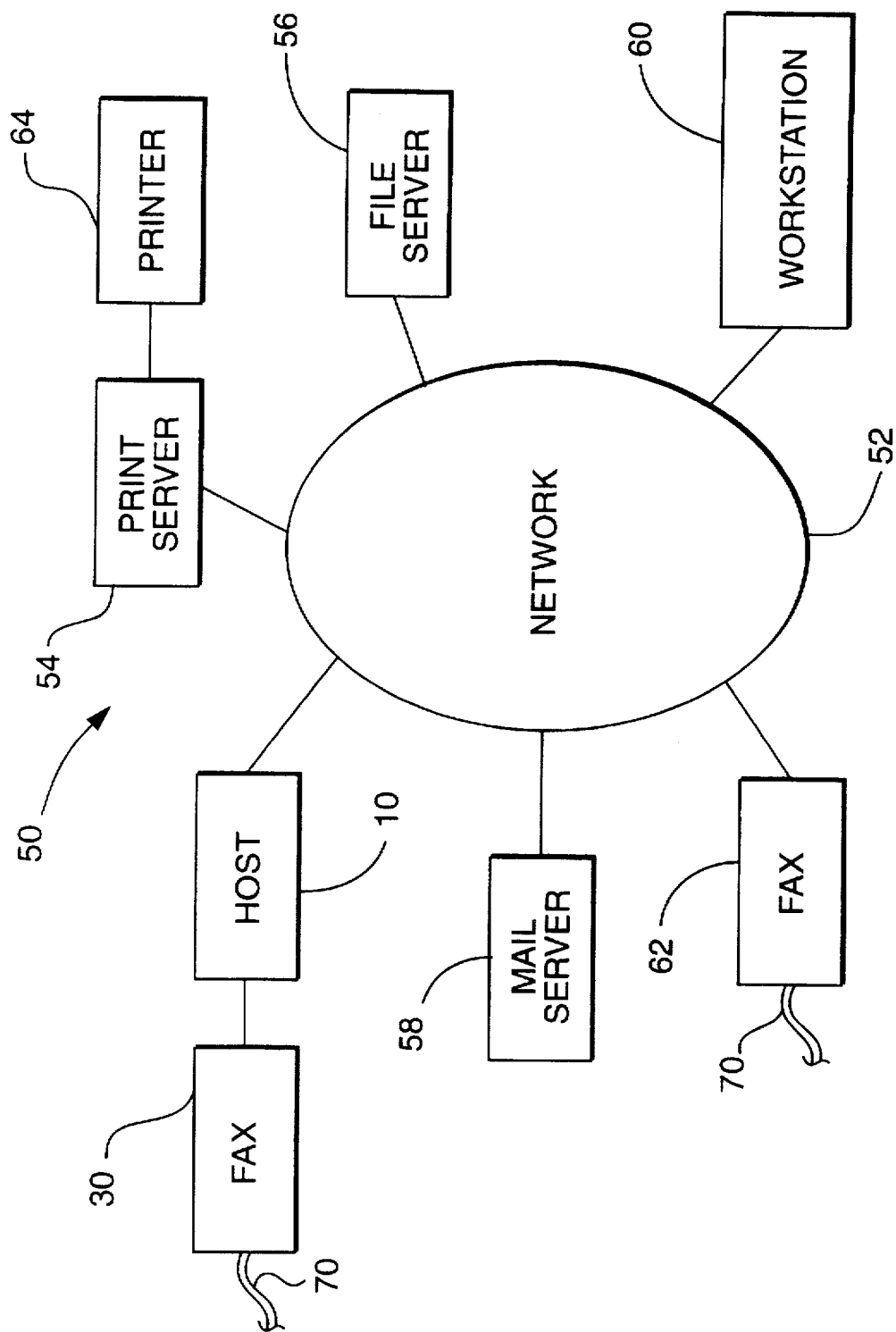
FIG. 1 is a block diagram showing the organization of the facsimile/E-mail transforming system based on an embodiment of this invention.

FIG. 1 shows the organization of a facsimile/E-mail transforming system 50 based on this embodiment. The system 50 includes a host unit 10 as a specific information processor which is linked through a network 52 to other information processors including a print server 54, file server 56, mail server 58, workstation 60 and facsimile unit 62, and a facsimile unit 30 which is connected directly to the host unit 10. The system constitutes a LAN (Local Area Network).

The print server 54 is a workstation assigned to a printer 64. The file server 56, which can be accessed by all LAN users, is a comprehensive file storage of the LAN having the abilities of storing files, updating files, organizing files, and controlling the access requests of the LAN users. The file server 56 is generally constituted by a computer having a large-capacity hard disk memory specialized for the shared file management task. The mail server 58 is a computer having E-mail boxes assigned to the LAN users. The host unit 10 is a main computer of the LAN, the workstation 60 is an individual computer (stand-alone computer), and the facsimile unit 62 is an individual facsimile unit (stand-alone facsimile unit).

Figure 2:
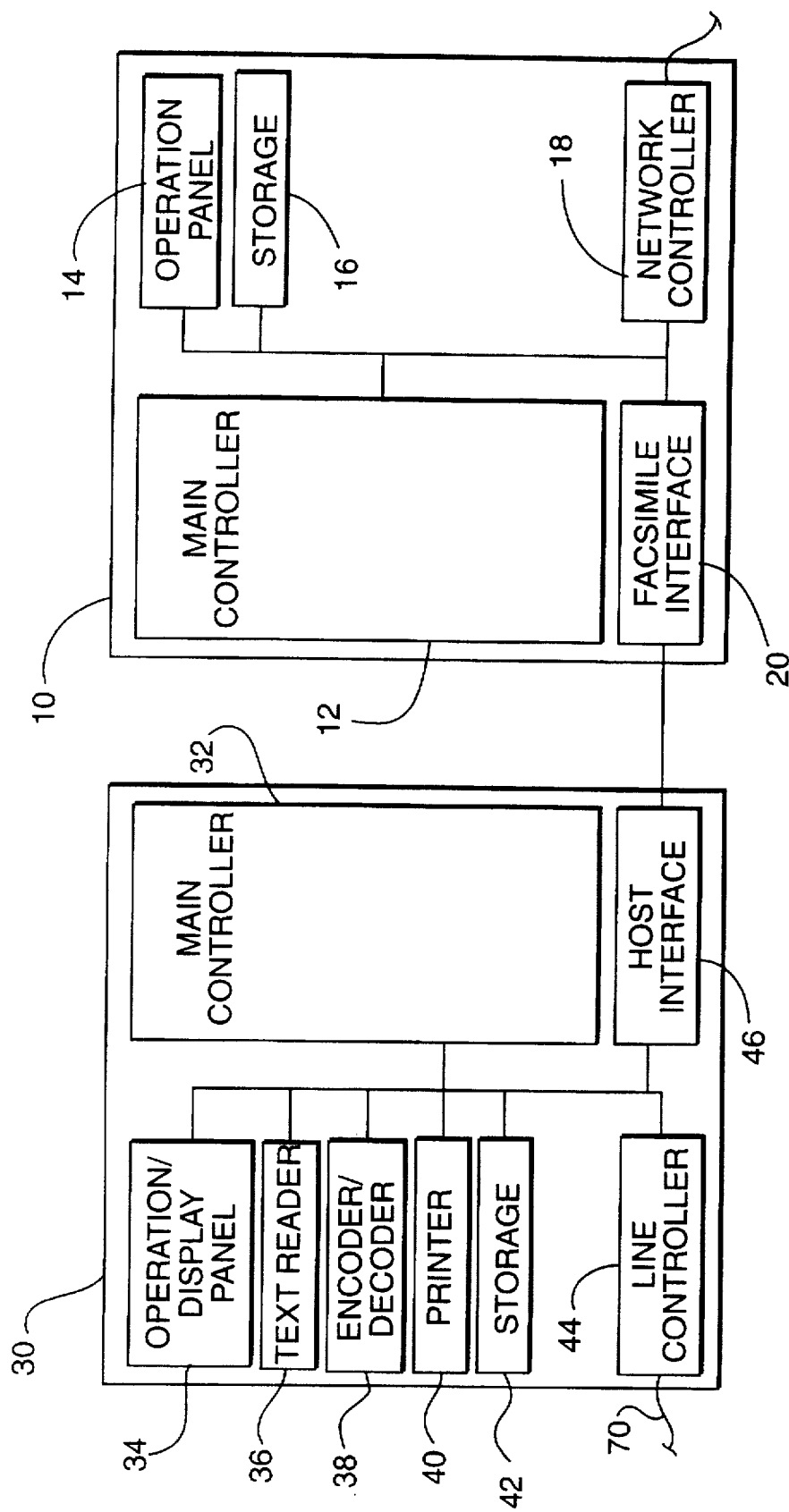
FIG. 2 is a block diagram generally showing the internal arrangement of a host unit and a connected facsimile unit shown in FIG. 1.

FIG. 2 shows the internal arrangement of the host unit 10 and the facsimile unit 30. The host unit 10 consists of a main controller 12, an operation panel 14, a storage 16 used for the reception type register means, a network controller 18 and a facsimile interface 20 which are all connected together through a system bus.

The main controller 12, which controls the whole host unit 10, includes a CPU (Central Processing Unit), ROM for storing a control program and data, and RAM used for the temporary memory (not shown in the figure). The operation panel 14 is a keyboard used by the operator. The storage 16 has relatively large capacity and stores a record of the reception types (i.e., the ability of receiving image data, literal data or vocal data) of the information processors 54–62 that are linked through the network 52 for receiving E-mails. The network controller 18, which includes the SCSI interface for example, performs interface control between the host unit 10 and the LAN. The facsimile interface 20 is connected externally to the host interface of the facsimile unit 30, and performs interface control between the host unit 10 and the facsimile unit 30.

The host unit 10 arranged as described above operates based on the control program to have the communication with the network (LAN), transact E-mail data with the facsimile unit 30 and analyze data, as will be explained later.

The facsimile unit 30 consists of a main controller 32, an operation/display panel 34, a text reader 36, an encoder/decoder 38, a printer 40, a storage 42, a line controller 44, and a host interface 46 all connected together through a system bus.

The main controller 32, which controls the whole facsimile unit 30, includes a CPU (Central Processing Unit), ROM for storing a control program and data, and RAM used for the temporary memory (not shown in the figure). The operation/display panel 34 includes a key section used by the operator and a display screen (not shown in the figure). The text reader 36 includes a color or monochrome (depending on the performance of the facsimile unit) scanner which reads the image of a text to produce image data.

The encoder/decoder 38 encodes image data which has been provided by the text reader 36 and stored in the storage 42 into compressed data, and decodes compressed image data. It operates based on the MH or MR scheme for monochrome image data or the DCT or ADCT scheme for color image data depending on the performance of the text reader 36. The printer 40 reproduces a text from received image data. The storage 42 has a capacity slightly larger than the usual page memory.

The line controller 44 connects and disconnects the facsimile unit 30 with originating facsimile units (not shown), and detects incoming calls from these units through the public telephone line 70. It includes a G3 line controller consisting of a modem and NCU and a G4 line controller (not shown in the figure). The host interface 46 performs interface control between the facsimile unit 30 and the host unit 10.

The facsimile unit 30, arranged as described above, has the function of transacting data with the host unit 10, in addition to the usual facsimile function. The other facsimile unit 62 is similar to the facsimile unit 30, with the host interface 46 being replaced with a network controller similar to the one 18 included in the host unit 10. The workstation 60 is similar to the host unit 10, with the facsimile interface 20 being absent.

Next, the E-mail delivery operation of the facsimile/E-mail transforming system arranged as described above will be explained with reference to the flowcharts of the control program of the facsimile unit 30 shown in FIG. 3 and the control program of the host unit 10 shown in FIGS. 4, 5 and 6.

Figure 3:
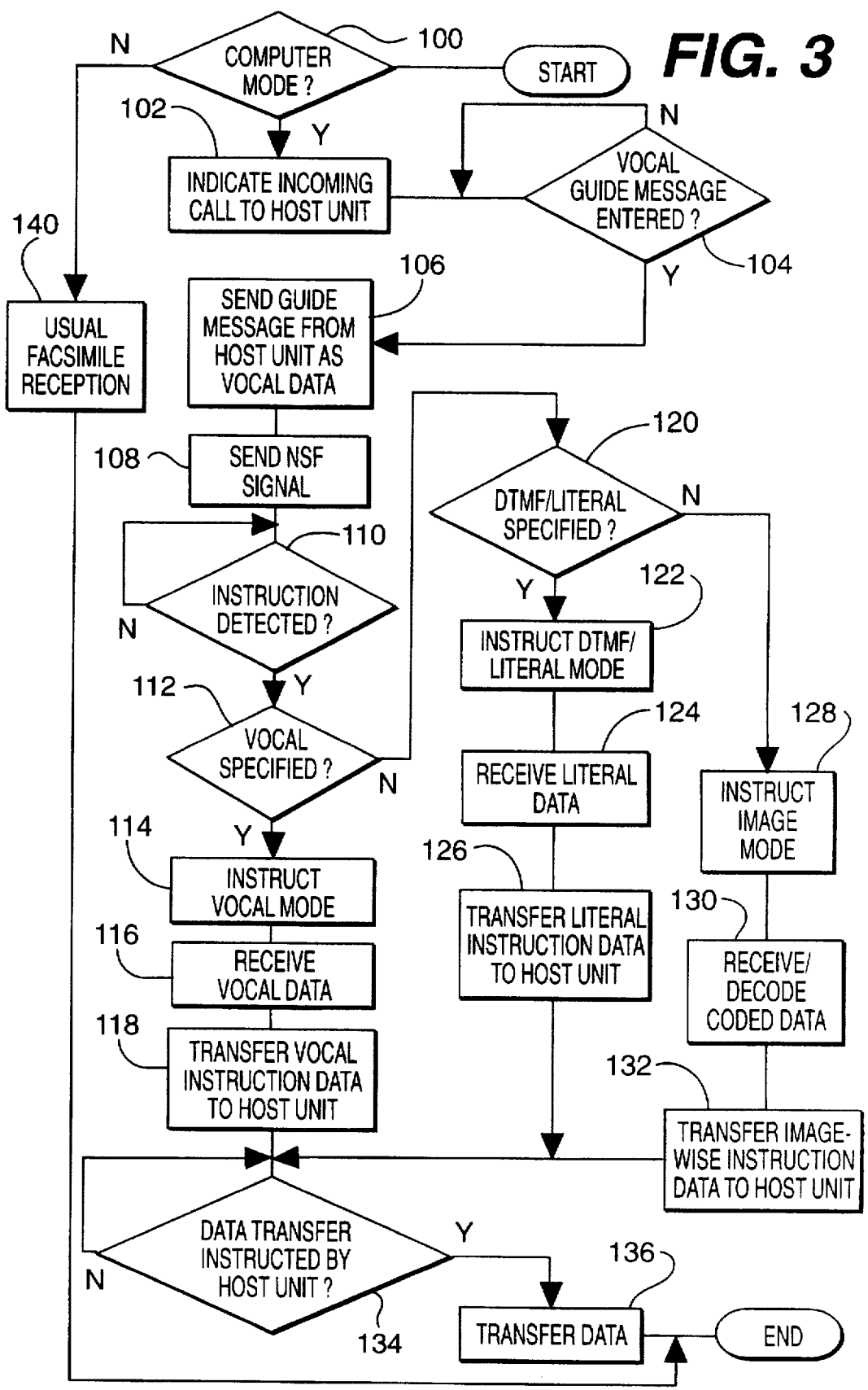
FIG. 3 is a flowchart showing a principal control program of the facsimile unit.

In FIG. 3, the control program of the facsimile unit 30 starts when the unit has an incoming call from an originating terminal through the public telephone line and it is indicted by the line controller 44 to the CPU in the main controller 32.

In step 100, it is detected whether the facsimile unit 30 is in computer mode (online operation with the host unit 10). This mode can be selected by the operator on the operation/display panel 34. Alternatively, this mode may be selected automatically based on the judgement of the main controller 32, or in response to the power-on condition of a certain information processor detected by way of the network controller 18 of the host unit 10, for example.

If the computer mode is negated in step 100, the sequence proceeds to step 140, in which the unit 30 implements the usual facsimile receiving operation, and the control program terminates. Otherwise, if the computer mode is affirmed in step 100, the sequence proceeds to step 102, in which the reception of the call is indicated to the host unit 10 by way of the host interface 46, the sequence further proceeds to step 104 to wait for the input of vocal guide message data from the host unit 10.

Figure 4:
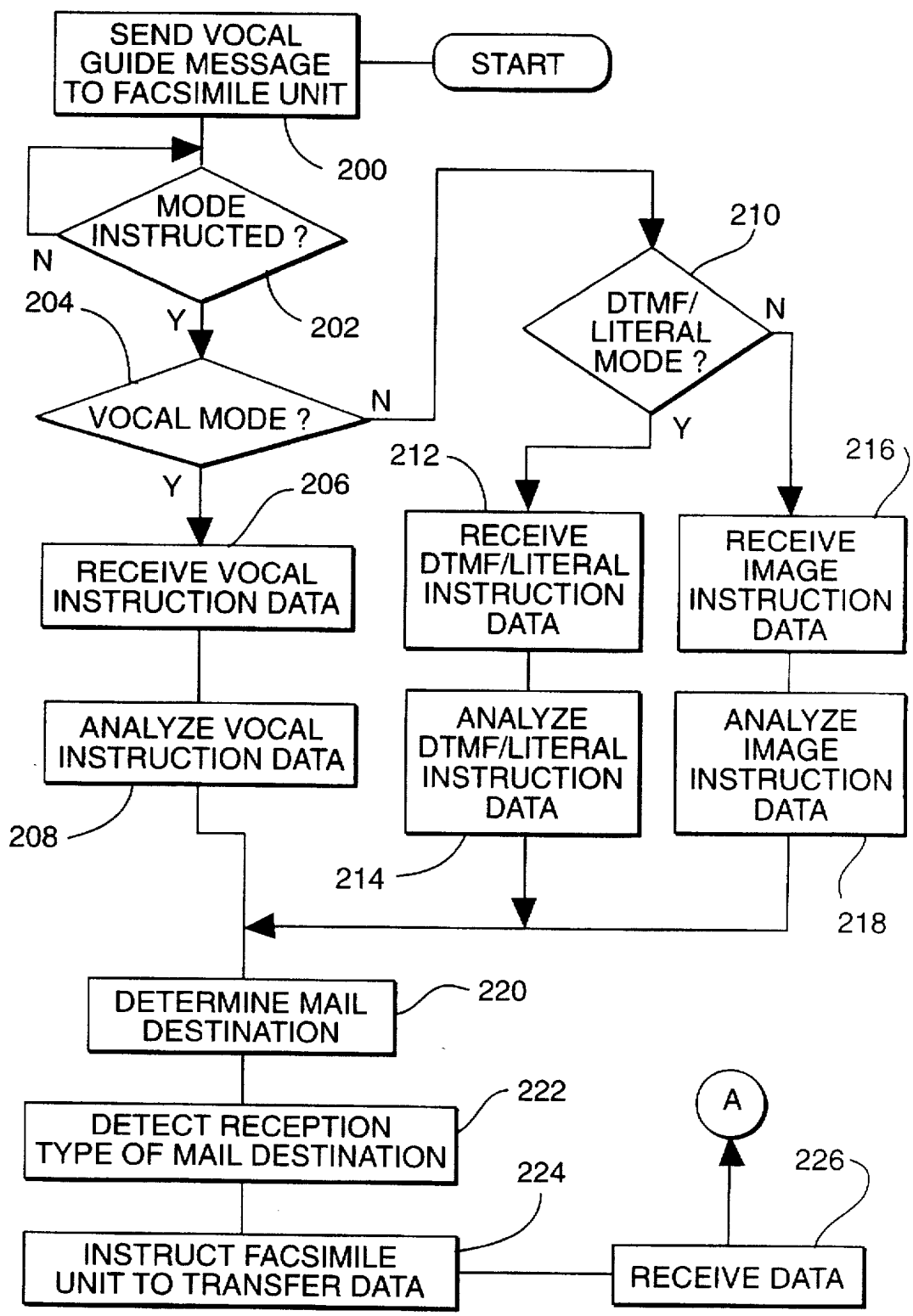
FIG. 4 is a flowchart showing a part of a principal control program of the host unit.

In FIG. 4, the control program of the host unit 10 starts when a call made by the facsimile unit 30 is indicated through the facsimile interface 20 to the CPU in the main controller 12.

In step 200, the host unit 10 sends vocal guide message data to the facsimile unit 30 through the facsimile interface 20. The vocal guide message is, for example: "This facsimile unit has mail transfer function". "Specify an E-mail destination in any form of DTMF signal, literal data, vocal data or image data, and enter mail information". To simplify the explanation, all operators of the system are assumed to have the knowledge of operation. The sequence proceeds to step 202 to wait for the instruction of reception mode (vocal mode, DTMF/literal mode or image mode) from the facsimile unit 30.

Returning to the operation of the facsimile unit 30 on the flowchart of FIG. 3, the reception of the vocal guide message data from the host unit 10 through the host interface 46 is affirmed in step 104. The sequence proceeds to step 106, in which the vocal guide message data is sent out over the public telephone line 70, which is followed by step 108. Consequently, the vocal guide message data is delivered to the operator of the originating terminal connected through the public telephone line 70.

In step 108, the NSF (non-standard function identification signal), CSI (called terminal identification signal) and DIS (digital identification signal) of the ordinary G3 protocol are sent out and the procedure of receiving protocol is commenced, and the sequence proceeds to step 110 to wait for the detection of an instruction from the originating terminal. The operation of step 108 enables the originating terminal, even if it is a usual facsimile unit, to transmit image data.

The operator of the originating terminal responds to the vocal guide message to send out destination indicating information and mail information. The destination indicating information received by the facsimile unit 30 through the public telephone line 70 is fed to the line controller 44 at which the condition of step 110 is affirmed, and the sequence proceeds to step 112. In step 112, it is detected whether the destination indicating information is in the form of vocal data, e.g., a message "Send a mail to Mr. XXXX" by means of telephone.

If the condition of step 112 is affirmed, the sequence proceeds to step 114 to indicate the vocal mode to the host unit 10 by way of the host interface 46. In the following step 116, the line controller 44 receives vocal data (mail information) which follows the destination indicating information, and it is stored in the storage 42.

Otherwise, if the condition of step 112 is negated, the sequence proceeds to step 120 to detect whether the destination indicating information is in the form of DTMF signal, i.e., a DTMF/literal instruction. In the case of DTMF/literal instruction, as affirmed in step 120, the E-mail destination information is instructed as a line tone (DTMF tone). In another case of image instruction, as detected as a negative result of the step 120, the destination information is instructed as image data, e.g., a header sheet shown in FIG. 9, mark sheet or OMR.

Following the affirmative result of step 120, the sequence proceeds to step 122 to indicate the DTMF/literal mode to the host unit 10 by way of the host interface 46, and thereafter proceeds to step 124, in which the line controller 44 receives literal data which follows the DTMF tone, and it is stored in the storage 42. Otherwise, following the negative result of step 120, the sequence proceeds to step 128 to indicate the image mode to the host unit 10 by way of the host interface 46, and thereafter proceeds to step 130, in which the line controller 44 receives coded data (image data) which follows the destination indicating information, and it is stored in the storage 42 by being decoded by the encoder/decoder 38.

Returning back to step 116 of vocal data reception, the destination indicating information in the form of vocal data is transferred to the host unit 10 by way of the host interface 46.

Following the step 124 of literal data reception, the sequence proceeds to step 126 to transfer the destination indicating information in the form of digitized DTMF tone to the host unit 10 by way of the host interface 46. Otherwise, following the step 130 of image data reception, the sequence proceeds to step 132 to transfer the destination indicating information in the form of image data to the host unit 10 by way of the host interface 46. In any case, after the destination indicating information has been transferred to the host unit 10, the sequence proceeds to step 134 to wait for the instruction of transfer of mail information from the host unit 10.

Returning to the flowchart of FIG. 4, the host unit 10 is waiting for the instruction of reception mode from the facsimile unit 30 in step 202, and the condition of this step is affirmed following any of the steps 114, 122 and 128 of reception mode instruction by the facsimile unit 30. The sequence proceeds to step 204 to detect whether it is the vocal mode. If the condition of step 204 is negated, the sequence proceeds to step 204 to detect whether it is the DTMF/literal mode.

On detecting the vocal reception mode, as affirmed in step 204, the sequence proceeds to step 206 to receive the vocal destination indicating data sent by the facsimile unit 30 in step 118 through the facsimile interface 20, and it is saved in the RAM in the main controller 12. The sequence proceeds to step 208 to analyze the vocal data based on the scheme of spectral matching, for example, as will be explained later.

On detecting the DTMF/literal reception mode, as affirmed in step 210, the sequence proceeds to step 212 to receive the DTMF/literal destination indicating data sent by the facsimile unit 30 in step 126 through the facsimile interface 20, and it is saved in the RAM in the main controller 12. The sequence proceeds to step 214 to analyze the DTMF/literal data (DTMF tone), which is specific to each E-mail destination, thereby to determine the destination.

On detecting the image reception mode, as a negative result of the step 210, the sequence proceeds to step 216 to receive the image-wise destination indicating data sent by the facsimile unit 30 in step 132 through the facsimile interface 20, and it is saved in the RAM in the main controller 12. The sequence proceeds to step 218 to analyze the image data based on the general scheme of image recognition, as will be explained later.

After the destination indicating data has been analyzed, the sequence proceeds to step 220 to determine an E-mail destination based on the result of analysis. In the case of image reception from a usual facsimile unit, the destination is determined to be unspecified in step 220.

In the subsequent step 222, the reception type of the information processor that has been determined to be the E-mail destination in step 220 is identified based on the record of reception types of all linked information processors (terminals) registered in the storage 16.

After one of reception types, i.e., vocal data reception, literal data reception or image data reception, is identified in step 224, the sequence proceeds to step 224 to prompt the facsimile unit 30 through the facsimile interface 20 to transfer mail data.

Returning to the flowchart of FIG. 3, the facsimile unit 30 is waiting for the instruction of data transfer from the host unit 10 in step 134. On receiving the transfer instruction from the host unit 10 in step 224 by way of the host interface 46, the condition of step 134 is affirmed, and the sequence proceeds to step 136 to transfer the data (mail information) to the host unit 10, and the facsimile unit 30 terminates the operation. The mail information transferred in step 136 is one of vocal data received in step 116, literal data received in step 124 and image data received and decoded in step 130. The vocal data is digitized for transfer.

Returning to the flowchart of FIG. 4, the host unit 10 receives the data of mail information, which is transferred from the facsimile unit 30 in the step 136, and stores it in the storage 16 in step 226.

Figure 5:
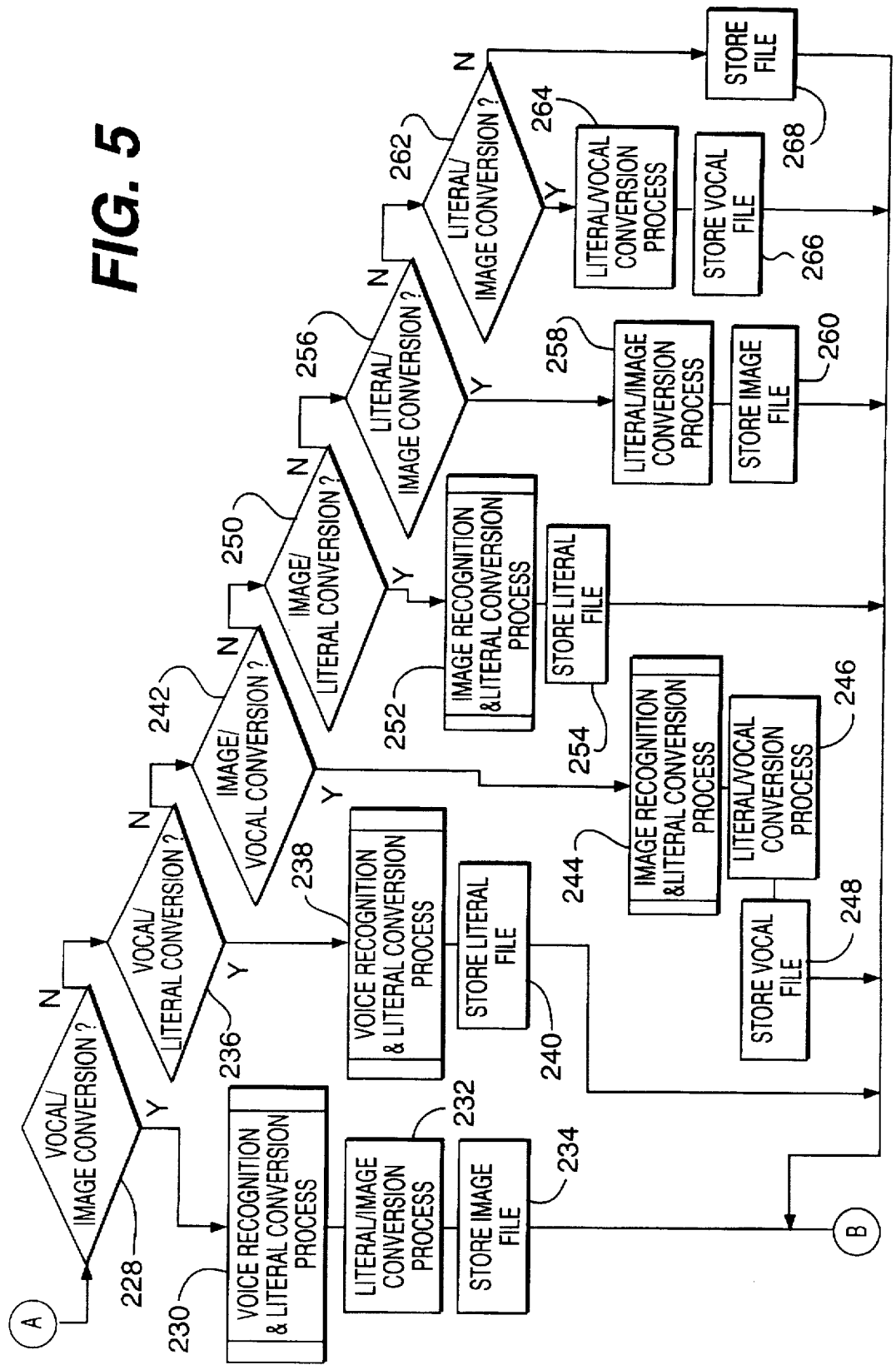
FIG. 5 is a flowchart showing another part of the principal control program of the host unit.
Figure 6:
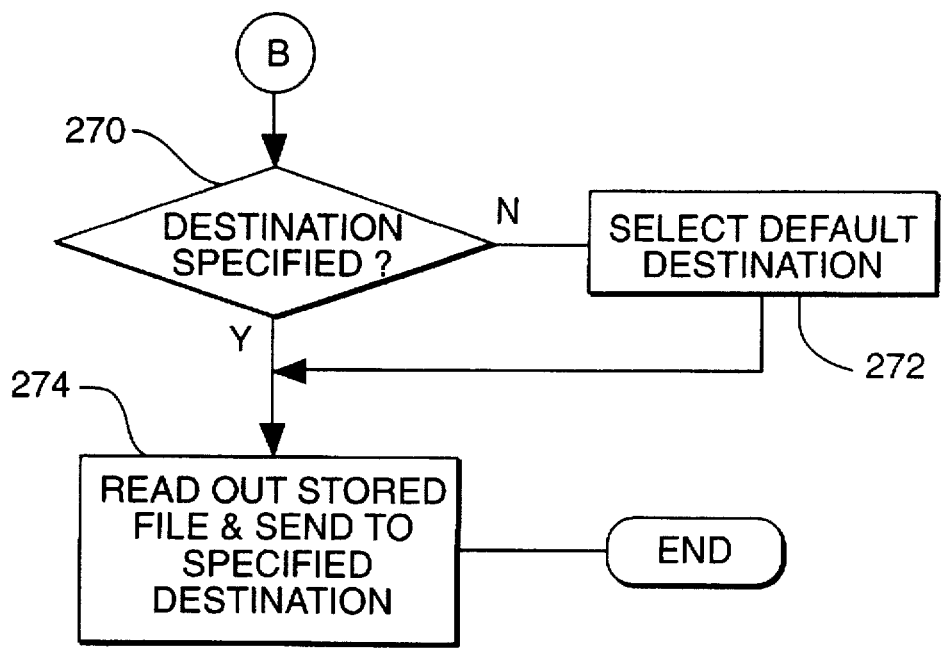
FIG. 6 is a flowchart showing a remaining part or the principal control program of the host unit.

The sequence proceeds to step 228 on the flowchart of FIG. 5, in which the received data is examined as to whether it needs the vocal/image conversion process. If this condition is negated, the sequence proceeds to step 236 to examine whether it needs the vocal/literal conversion process. If this condition is negated, the sequence proceeds to step 242 to examine whether it needs the image/vocal conversion process. If this condition is negated, the sequence proceeds to step 250 to examine whether it needs the image/literal conversion process. If this condition is negated, the sequence proceeds to step 256 to examine whether it needs the literal/image conversion process. If this condition is negated, the sequence proceeds to step 262 to examine whether it needs the literal/vocal conversion process.

These decision steps are implemented based on the reception type of destination terminal identified in step 222 and the form of data received in step 226, and the sequence branches into the following seven paths.

(1) Delivery of vocal data to a terminal which is set to receive image data: The condition of step 228 is affirmed, and the sequence branches to the vocal/image conversion process of steps 230–234.

(2) Delivery of vocal data to a terminal which is set to receive literal data: The condition of step 236 is affirmed, and the sequence branches to the vocal/literal conversion process of steps 238–240.

(3) Delivery of image data to a terminal which is set to receive vocal data: The condition of step 242 is affirmed, and the sequence branches to the image/vocal conversion process of steps 244–248.

(4) Delivery of image data to a terminal which is set to receive literal data: The condition of step 250 is affirmed, and the sequence branches to the image/literal conversion process of steps 252–254.

(5) Delivery of literal data to a terminal which is set to receive image data: The condition of step 256 is affirmed, and the sequence branches to the vocal/literal conversion process of steps 258–260.

(6) Delivery of literal data to a terminal which is sat to receive vocal data: The condition of step 262 is affirmed, and the sequence branches to the literal/vocal conversion process of steps 264–266.

(7) Delivery of vocal data to a terminal which is set to receive vocal data, or delivery of image data to a terminal which is set to receive image data, or delivery of literal data which is set to receive literal data: The condition of step 262 is negated, and the sequence branches to step 268.

The following explains each of the above-mentioned seven cases.

Figure 7:
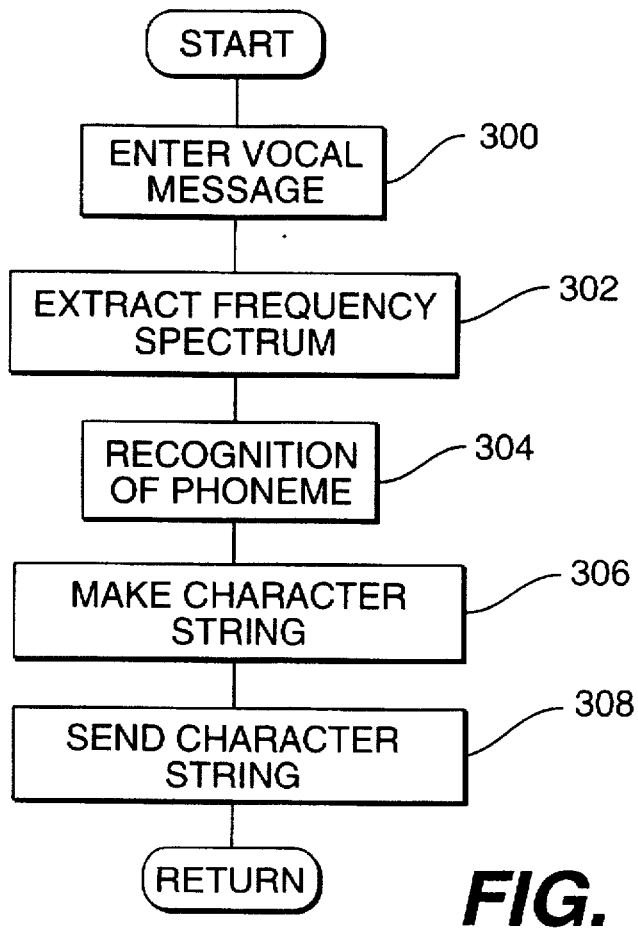
FIG. 7 is a flowchart showing a subroutine of a voice recognition & vocal/literal conversion process.

(1) Vocal/image conversion process: In step 230, the subroutine of voice recognition & literal conversion process shown in FIG. 7 is executed. The digital vocal data which has been saved in the storage 16 in step 226 is loaded into the working area of the RAM in step 300, and rendered the Fourier transformation for the loaded vocal data in step 302 thereby to extract frequency spectra. In the next step 304, the extracted spectra are compared with the reference spectra thereby to extract matched portions as phonemes, and a string of characters are generated as character string data (literal data) in correspondence to the string of phonemes. In the next step 308, the completed character string data is saved in the storage 16, and the sequence returns to step 232 of the main routine of FIG. 5.

Among a variety of voice recognition techniques which have been developed, the spectrum matching method is most widely used. Although the software-based spectrum matching process is employed in this embodiment, it can be implemented by use of band-pass filters.

In step 232 of the main routine, the character string data is converted into image information based on the literal/image conversion process known in the art, and the resulting image data is filed in the storage 16 in step 234.

(2) Vocal/literal conversion process: In step 238, the subroutine of voice recognition & literal conversion process is executed so that the vocal data is converted into character string data (literal data) in the same manner as the above case (1). In the next step 240, the resulting character string data is filed in the storage 16.

Figure 8:
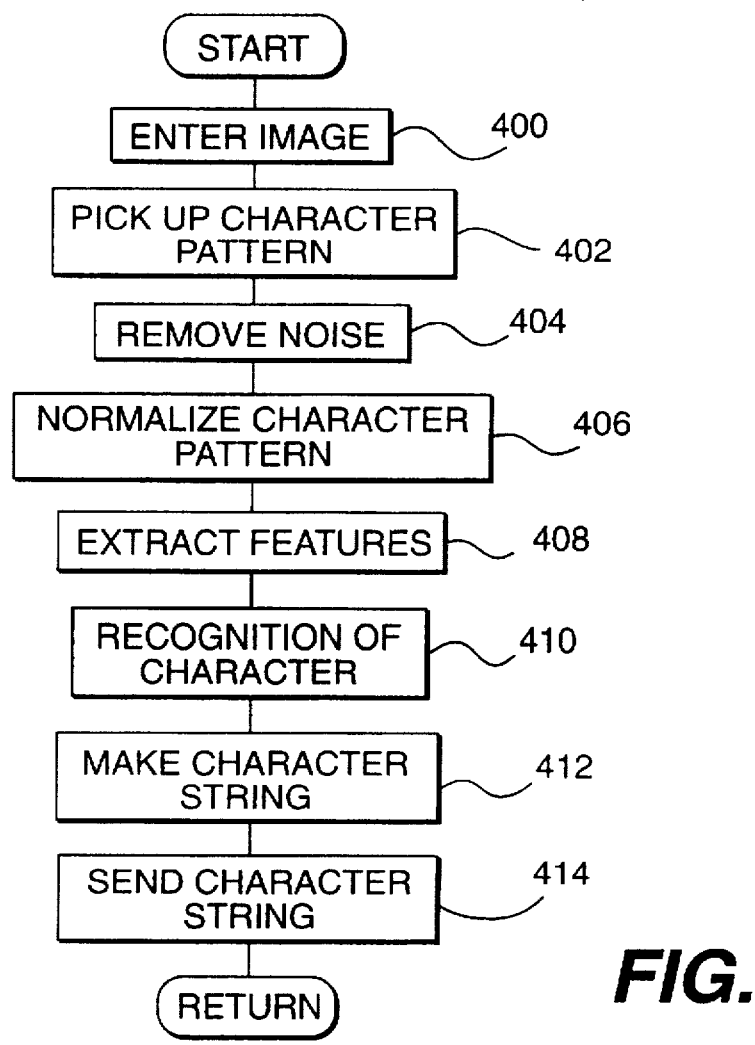
FIG. 8 is a flowchart showing a subroutine of a image recognition & image/literal conversion process.
Figure 9:
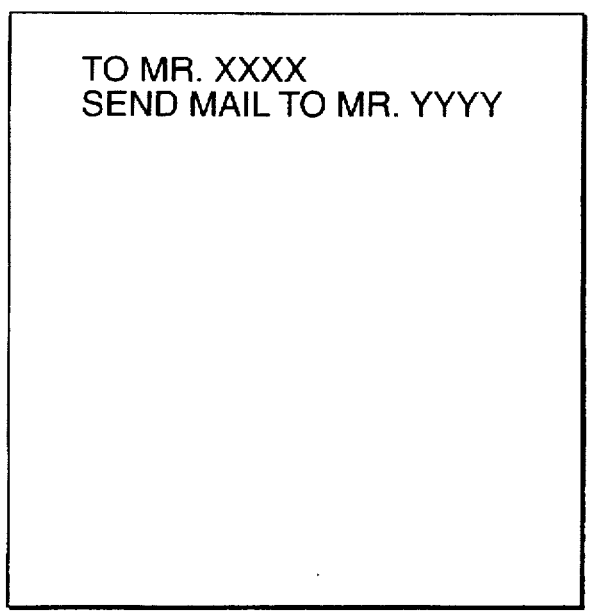
FIG. 9 is a diagram showing an example of a header sheet in which destination indicating information in the form of image data is appended.

(3) Image/vocal conversion process: In step 244, the subroutine of image recognition & literal conversion process shown in FIG. 8 is executed. The image data which has been saved in the storage 16 in step 226 is loaded into the working area of the RAM as bit image data in step 400. In the next step 402, each bit pattern of character is picked out of the bit image data, and isolated bits are removed as noises in step 404. In the next step 406, the size, inclination, position, line width and blurring of each character pattern are normalized, and parameters which characterize the character pattern is extracted from the normalized character in step 408. Characterizing parameters include the frequency spectrum, profile shape, loops, end points and intersections.

In the next step 410, each character pattern is identified as a character based on the matching process for the extracted features, and a string of characters are generated as character string data (literal data) in step 412. In the next step 414, the completed character string data is saved in the storage 16, and the sequence returns to step 246 of the main routine of FIG. 5.

Although the popular method is employed in this embodiment among a variety of image (character) recognition techniques which have been developed, other method may be used.

In step 246 of the main routine, the character string data is converted into vocal data based on the literal/vocal conversion process known in the art, and the resulting vocal data is filed in the storage 16 in step 248.

(4) Image/literal conversion process: In step 252, the subroutine of voice recognition & literal conversion process is executed so that the image data is converted into character string data (literal data) in the same manner as the above case (1). In the next step 254, the resulting character string data is filed in the storage 16.

(5) Literal/image conversion process: In step 258, the subroutine of literal/image conversion process is executed so that the literal data is converted into image data based on a known technique. In the next step 260, the resulting image data is filed in the storage 16.

(6) Literal/vocal conversion process: In step 264, the subroutine of literal/vocal conversion process is executed so that the literal data is converted into vocal data based on a known technique. In the next step 266, the resulting vocal data is filed in the storage 16.

(7) In step 268 of the main routine, mail data of any form (vocal, image or literal) which has been received in step 226 is filed intact in the storage 16.

After a file of mail information has been stored in the storage 16 in any of the foregoing seven cases, the sequence proceeds to step 270, to detects based on the result of the step 220, as to whether the destination is specified. If the condition of step 270 is affirmed, the sequence proceeds to step 274 to read out the stored file (mail information) and transmit (transfer) it to the specified information processor by way of the network controller 18. Otherwise, if the condition of step 270 is negated, the sequence proceeds to step 272 to select the default destination as a specified E-mail destination, and the sequence proceeds to step 274. The default destination must be a terminal capable of receiving image data, since the absence of destination specification is the case of the usual facsimile communication.

After the file is transmitted to the specified destination, the E-mail delivery operation completes.

According to the embodiment of this invention described above, it becomes possible for usual facsimile units and other terminals (originating terminals) connected through the facsimile adapter to the public telephone line 70 to send E-mails to information processors (workstations, etc.) on the LAN by way of the facsimile unit 30 as a gateway and the host unit 10 connected to it. The operator of an originating terminal merely needs to enter mail information and destination indicating information in any form of DTMF tone, image data or vocal data, and the E-mail is delivered automatically to the intended destination without the need of other manual operation by the LAN user on the part of the workstation.

The inventive system allows the use of terminals, which have the push-button dialing function and the ability of creating literal data, usual telephone sets and facsimile units as originating terminals.

The inventive system has various data conversion functions and is capable of delivering E-mail information in the adapted data form to the intended destination even if the originating terminal and destination terminal are designed to deal with data of different types.

In the foregoing embodiment of this invention, the main controller 12 of the host unit 10 functions to accomplish the data analysis means, data form conversion means, vocal/literal conversion means, vocal/image conversion means, image/literal conversion means, image/vocal conversion means, literal/image conversion means and literal/vocal conversion means. The network controller 18 and main controller 12 in unison function to accomplish the transmission means. The host interface 46 and main controller 32 of the facsimile unit 30 function to accomplish the transfer means. Although in the foregoing embodiment, destination indicating data is analyzed on the part of the host unit 10, with the intention of utilizing the sophisticated analyzing functions possessed by the host unit (workstation), the present invention is not confined to this design, but these analyzing functions may be built in the main controller of the stand-alone facsimile unit 62, for example.

Although in the foregoing embodiment, if the type of data sent from an originating terminal is different from the data type treated by a destination information processor, the data conversion process of vocal to image, image to literal, image to vocal, image to literal, literal to image or literal to vocal is implemented in correspondence to the reception type set on the destination terminal so that the E-mail in the adapted data form is delivered to the destination, all E-mails may be delivered intact without the conversion of data form to all destinations, or only some of these six data form converting processes may be applied.

Although, in the foregoing embodiment, the facsimile unit 30, and the host unit 10 connected to it, directly transact data with each other so as to deliver mail information to specified destinations, an alternative manner is to let the facsimile unit 62 and a stand-alone terminal such as the workstation 60 transact data with each other through the network 52 so as to deliver mail information to specified destinations. A further alternative manner is to provide the facsimile unit 62 with all functions necessary for the delivery of E-mails.

Although in the foregoing embodiment, the DTMF tone is used as DTMF/literal indicating data, literal data (coded data) may be used instead and analyzed by the host unit 10.

Although in the foregoing embodiment, mail information is delivered by the host unit 10 to the destination terminal specified by the originating terminal, mail information may be delivered to the E-mail box assigned to the user so that the user fetches the E-mail from the box, as in the case of the conventional E-mail system.

The effectiveness of the inventive system is as follows.

According to the first facsimile/E-mail transforming system referenced in the Summary of the Invention, the originating terminal connected to the public telephone line merely needs to send mail information and destination indicating information over the telephone line, and the E-mail is delivered automatically to the intended destination information processor. Namely, the system enables general terminals such as facsimile units to send E-mails through the public telephone line to destination terminals on another network such as a LAN by using a facsimile unit as a gateway.

According to another aspect of the facsimile/E-mail transforming system, the operator of the originating terminal connected to the public telephone line merely needs to send mail information and destination indicating information, and the E-mail is delivered to the intended destination information processor by being converted automatically to the adapted data form of the destination terminal. Namely, even if destination information processors on the network have data reception types different from types of data sent by originating terminals connected to the public telephone line, E-mails can be delivered in adapted forms to the individual destination terminals.

According to the second facsimile/E-mail transforming system referenced in the Summary of the Invention, the originating terminal connected to the public telephone line merely needs to send mail information and destination indicating information over the telephone line, and the E-mail is delivered automatically to the intended destination information processor. Namely, the same effectiveness as the first system is attained.

In accordance with other aspects of the second system of the invention:

the operator of the originating terminal connected to the public telephone line merely needs to send mail information and the DTMF signal in the manner of push-button dialing as destination indicating information, and the E-mail is delivered automatically to the intended destination terminal;

a facsimile unit, for example, as an originating terminal merely needs to append an image-wise destination indicating message in the header field of a text to be sent, and the E-mail is delivered automatically to the intended destination terminal;

the operator of the originating terminal connected to the public telephone line merely needs to send mail information and a vocal destination indicating message, and the E-mail is delivered automatically to the intended destination terminal;

the operator of the originating terminal connected to the public telephone line merely needs to send mail information and a literal destination indicating message, and the E-mail is delivered automatically to the intended destination terminal;

when the originating terminal is of the type of dealing with vocal data and the destination terminal is of the type of dealing with literal data, such as a workstation, E-mails are delivered automatically in the adapted data form without the need of operator intervention in the operation of the facsimile unit;

when the originating terminal is of the type of dealing with vocal data and the destination terminal is of the type of dealing with image data, E-mails are delivered automatically in the adapted data form without the need of operator intervention in the operation of the facsimile unit;

when the originating terminal is of the type of dealing with image data, such as a facsimile unit, and the destination terminal is of the type of dealing with literal data, E-mails are delivered automatically in the adapted data form without the need of operator intervention in the operation of the facsimile unit that constitutes the gateway;

when the originating terminal is of the type of dealing with image data, such as a facsimile unit, and the destination terminal is of the type of dealing with vocal data, E-mails are delivered automatically in the adapted data form without the need of operator intervention in the operation of the facsimile unit that constitutes the gateway;

when the originating terminal is of the type of dealing with literal data, such as a workstation, and the destination terminal is of the type of dealing with image data, such as a facsimile unit, E-mails are delivered automatically in the adapted data form without the need of operator intervention in the operation of the facsimile unit that constitutes the gateway;

when the originating terminal is of the type of dealing with literal data, such as a workstation, and the destination terminal is of the type of dealing with vocal data, E-mails are delivered automatically in the adapted data form without the need of operator intervention in the operation of the facsimile unit that constitutes the gateway; and/or the operator of the originating terminal connected to the public telephone line merely needs to send mail information and destination indicating information, and the E-mail is delivered to the intended destination information processor by being converted automatically to the adapted data form of the destination terminal. Namely, even if destination information processors on the network have data reception types different from types of data sent by originating terminals connected to the public telephone line, E-mails can be delivered in adapted forms to the individual destination terminals.

What is claimed is:

1. A facsimile/electronic-mail transforming system comprising a specific information processor linked through a network to a plurality of other information processors as destinations of electronic mail (E-mail), and a facsimile unit connected directly or through said network to said specific information processor and also connected to a public telephone line, wherein said facsimile unit includes reception means for receiving mail information, with destination indicating information appended thereto, from an originating terminal connected through said public telephone line, and wherein one of said facsimile unit and said specific information processor includes analysis means for analyzing destination indicating information received by said reception means, thereby to determine an E-mail destination, data form conversion means for reforming the mail information received by said reception means to a data form receivable by the E-mail destination determined by said analysis means, and transmission means for transmitting the reformed mail information to the determined E-mail destination.

2. A facsimile/electronic-mail transforming system according to claim 1, wherein one of said facsimile unit and said specific information processor further includes reception type register means in which the reception types of said other information processors are registered in advance, and said data form conversion means reforms the mail information in accordance with the record in said reception type register means relevant to the destination, said transmission means transmitting the reformed mail information to the determined E-mail destination.

3. A facsimile/electronic-mail transforming system comprising a specific information processor linked through a network to a plurality of other information processors as destinations of electronic mail (E-mail), and a facsimile unit connected directly or through said network to said specific information processor and also connected to a public telephone line, wherein said facsimile unit includes reception means for receiving mail information, with destination indicating information appended thereto, from an originating terminal connected through said public telephone line, and transfer means for transferring the information received by said reception means to said specific information processor, and wherein said specific information processor includes analysis means for analyzing destination indicating information transferred by said transfer means thereby to determine an E-mail destination, data form conversion means for reforming the mail information transferred by said transfer means to have a data form receivable by the E-mail destination determined by said analysis means, and transmission means for transmitting the reformed mail information to the determined E-mail destination.

4. A facsimile/electronic-mail transforming system according to claim 3, wherein said analysis means analyzes a DTMF signal as destination indicating information thereby to determine an E-mail destination.

5. A facsimile/electronic-mail transforming system according to claim 3, wherein said analysis means analyzes image data as destination indicating information thereby to determine an E-mail destination.

6. A facsimile/electronic-mail transforming system according to claim 3, wherein said analysis means analyzes vocal data as destination indicating information thereby to determine an E-mail destination.

7. A facsimile/electronic-mail transforming system according to claim 3, wherein the analysis means analyzes literal data as destination indicating information thereby to determine an E-mail destination.

8. A facsimile/electronic-mail transforming system according to claim 3, wherein said data form conversion means includes vocal/literal conversion means for converting vocal data transferred by said transfer means into literal data, said transmission means transmitting the converted literal data to the E-mail destination determined by said analysis means.

9. A facsimile/electronic-mail transforming system according to claim 3, wherein said data form conversion means includes vocal/image conversion means for converting vocal data transferred by said transfer means into image data, said transmission means transmitting the converted image data to the E-mail destination determined by said analysis means.

10. A facsimile/electronic-mail transforming system according to claim 3, wherein said data form conversion means includes image/literal conversion means for converting image data transferred by said transfer means into literal data, said transmission means transmitting the converted literal data to the E-mail destination determined by said analysis means.

11. A facsimile/electronic-mail transforming system according to claim 3, wherein said data form conversion means includes image/vocal conversion means for converting image data transferred by said transfer means into vocal data, said transmission means transmitting the converted vocal data to the E-mail destination determined by said analysis means.

12. A facsimile/electronic-mail transforming system according to claim 3, wherein said data form conversion means includes literal/image conversion means for converting literal data transferred by said transfer means into image data, said transmission means transmitting the converted image data to the E-mail destination determined by said analysis means.

13. A facsimile/electronic-mail transforming system according to claim 3, wherein said data form conversion means includes literal/vocal conversion means for converting literal data transferred by said transfer means into vocal data, said transmission means transmitting the converted vocal data to the E-mail destination determined by said analysis means.

14. A facsimile/electronic-mail transforming system according to claim 3, wherein said specific information processor further includes reception type register means in which the reception types of said other destination information processors are registered in advance, and said data form conversion means reforms the mail information in accordance with the record in said reception type register means relevant to the destination, said transmission means transmitting the reformed mail information to the determined E-mail destination.

15. A facsimile/electronic-mail transforming system comprising a plurality of information processors as destinations of electronic mails (E-mails) linked through a network, and a facsimile unit linked through said network to any of said information processors and also connected to a public telephone line, wherein said facsimile unit includes reception means for receiving mail information from an originating terminal connected through said public telephone line, determination means for determining an E-mail destination by analyzing destination information received by said reception means, data form conversion means for reforming the mail information received by said reception means to have a data form receivable by the E-mail destination determined by said determination means, and transmission means for transmitting the reformed mail information to the E-mail destination determined by said determination means.

* * * * *